United States Patent
Finzel et al.

[11] Patent Number: 5,815,629
[45] Date of Patent: Sep. 29, 1998

[54] CAP SLEEVE FOR LIGHT WAVEGUIDE CABLES

[75] Inventors: Lothar Finzel, Unterschleissheim; Guenter Schroeder, Esting, both of Germany

[73] Assignee: Siemens Aktiengesellschaft, Munich, Germany

[21] Appl. No.: 698,726

[22] Filed: Aug. 16, 1996

[30] Foreign Application Priority Data

Aug. 18, 1995 [DE] Germany ............... 195 30 479.9

[51] Int. Cl.⁶ ........................................... G02B 6/00
[52] U.S. Cl. ........................................... 385/134
[58] Field of Search .................... 385/134, 135, 385/147

[56] References Cited

U.S. PATENT DOCUMENTS

| | | | |
|---|---|---|---|
| 5,278,933 | 1/1994 | Hunsinger et al. | 385/134 X |
| 5,457,763 | 10/1995 | Kerry | 385/134 |
| 5,457,764 | 10/1995 | Edera | 385/134 |
| 5,495,549 | 2/1996 | Schneider et al. | 385/134 |
| 5,633,973 | 5/1997 | Vinccent et al. | 385/134 X |
| 5,655,044 | 8/1997 | Finzel et al. | 385/135 |
| 5,657,412 | 8/1997 | Caudrelier | 385/134 X |

FOREIGN PATENT DOCUMENTS 40 08 840 C1  8/1991  Germany .

*Primary Examiner*—Akm E. Ullah
*Attorney, Agent, or Firm*—Hill & Simpson

[57] ABSTRACT

A cap sleeve for a light waveguide cable for universal employment in a light waveguide network receives a fastening frame, which provides a storage space for excess lengths of uncut light waveguide multi-fiber bundles, and provides a splicing block on which individual splicing cassettes can be removed by a tilting motion.

11 Claims, 4 Drawing Sheets

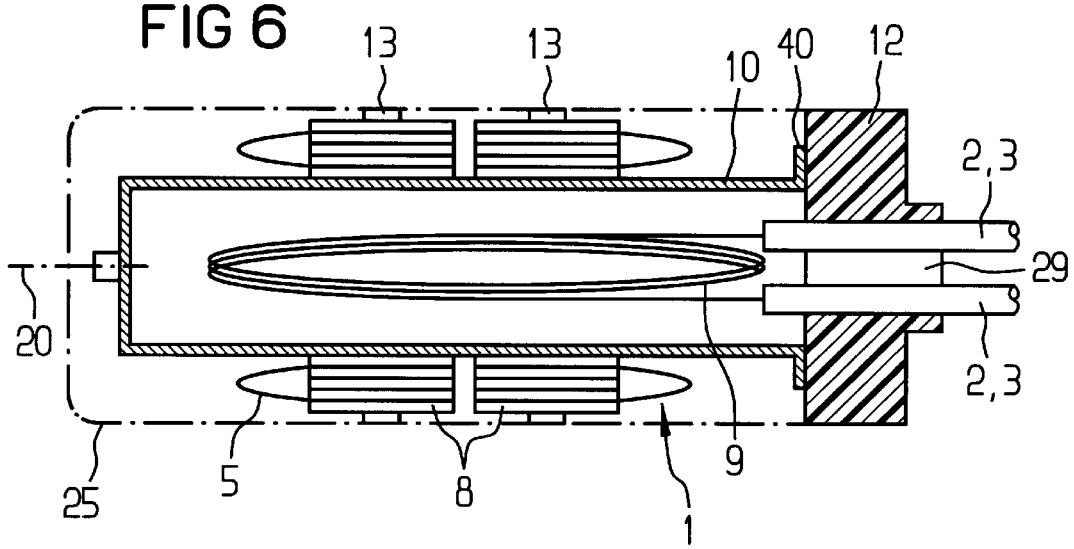
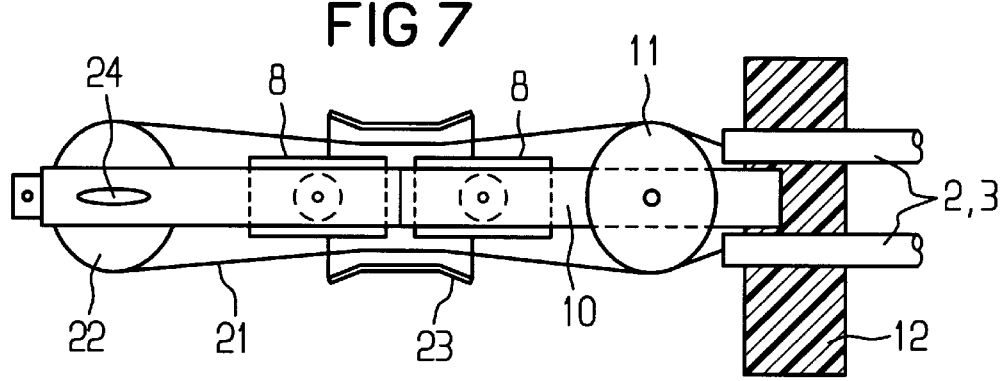

CAP SLEEVE FOR LIGHT WAVEGUIDE CABLES

BACKGROUND OF THE INVENTION

The present invention is directed to a cap sleeve for light waveguide cables having a plurality of splicing cassettes for the acceptance of light waveguide splices combined in a splicing block.

When planning communication networks with light waveguides, the number of subscribers is usually not yet determined. In particular, the distribution of the subscribers within a region is usually open and subject to change. Since, over time, new industries, service industries and residential areas are being added to the infrastructure, it is extremely difficult to predict future changes in the infrastructure. In order to obtain an optimally high coverage dependability, a high degree of expansion must be taken into consideration when planning such a network. This is necessary when the number of subscribers increases or when future services are offered, and then will cause higher outlays to be usually exerted for performance in advance.

German Patent 40 08 840 C1 discloses an arrangement of light waveguide splice distributors that can be utilized in traditional connecting or dividing sleeves. The light waveguides therein are introduced into individual splicing cassettes by groups and are deposited in a splice holder after the splicing. This, however, requires much assembly work, whereby a great deal of sleeve space is required by the individual cassettes that are stacked one upon the other. Moreover, the accessibility to an individual splicing cassette is limited.

Prior art connecting points of main cables having splicing, branching or, respectively, division functions for light waveguides are illustrated in FIGS. 1–5, which show various functions. For example, in FIG. 1, a cutting technique, wherein multi-fiber loose bundles 5a of a cable 3 are continuously through-connected. In the arrangement of FIG. 2, not only do you have continuously through-connected fibers 5a, but also individual connections 4a spliced onto a fiber of cable 3. In the arrangement of FIG. 3, all of the optical waveguides of two cable ends 2 are spliced by connections 6. FIG. 4 illustrates a branching technique, wherein the light waveguides of an incoming cable 3 are branched into a plurality of outgoing cables 4 and finally, in a fifth option of FIG. 5, a plurality of branching cables 4 are branched-off from one point of the incoming cable 3 by splice connections 7.

SUMMARY OF THE INVENTION

An object of the present invention is to create a cap sleeve for light waveguide cables, wherein the removal of individual splicing cassettes from a modularly-constructed, flexible connecting point is enabled and wherein it should be provided that excess lengths of uncut light waveguide multi-fiber bundles can be deposited in a surveyable way. The object is inventively achieved with an improvement of a cap sleeve for light waveguide cables having a plurality of splicing cassettes combined in a splicing block for the acceptance of light waveguide splices. The improvements are that the cap sleeve includes a fastening frame arranged with the seal member of the cap sleeve, said fastening frame providing a storage space for uncut light waveguide multi-fiber loose coils or loops, a fastening pin being arranged on the fastening frame for holding the splicing cassettes and the housing of each of the splicing cassettes comprising a guide slot into which the fastening pin can be respectively introduced so that each splicing cassette can be individually removed from the splice block by a tilting motion.

The advantage of the cap sleeve of the invention is that all variations of modular connecting points, such as continuous through connections, individual splice connections, cable splices or branching of cables, can be covered and provided in the housing. Such a modularly-constructed light waveguide connecting point is suitable for an annularly designed self-contained light waveguide network that supplies an entire district with light waveguides in the main cable region. The connecting points of the main cable have a splicing, branching or, respectively, division function for the light waveguides.

All of these techniques known in the prior art can be utilized in the inventive cap sleeve so that it can be viewed as a universal connecting point. It is, thus, significant that the splicing, connecting or branching points are accommodated on splicing cassettes and that these splicing cassettes are individually accessible and, moreover, are splicing spaces additionally present for uncut light waveguide multi-fiber loose coils of an introduced light waveguide cable.

For example, a through-single ply SZ-stranded cable can be cut in a junction. To that end, the cable cladding is to be removed over a certain length. The light waveguide multi-fiber loose coil of fibers or light waveguide ribbons are deposited in a plurality of loops within the cap sleeve. The main cable and the branching cables are introduced through the seal member of the cap sleeve proceeding from one side and are sealed, fixed and potentially grounded. In the connecting point with the cap sleeve of the invention, all functions that occur are integrated in a universally valid concept, as already set forth above. As needed, the modules for division, multi-fiber loose bundle guidance, splicing and/or division with or without couplers can be attached to the basic module. Moreover, the splicing cassettes are attached in pairs in a splicing block on a preferably divided fastening frame composed of mass-produced parts.

Other advantages and features of the invention will be readily apparent from the following description of the preferred embodiments, the drawings and claims.

BRIEF DESCRIPTION OF THE DRAWINGS

FIG. 6 is a longitudinal cross sectional view of an exemplary embodiment for accommodating uncut light waveguides having excess length within a fastening frame;

FIG. 7 is a side view with portions removed of an exemplary embodiment wherein excess lengths are arranged between deflection rollers;

DESCRIPTION OF THE PREFERRED EMBODIMENTS

Figure 1:
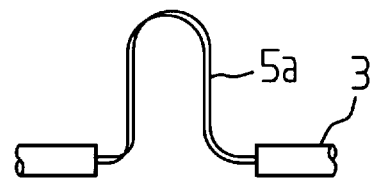
FIGS. 1–5 are schematic presentations which diagrammatically show different functions of a cap sleeve.
Figure 2:
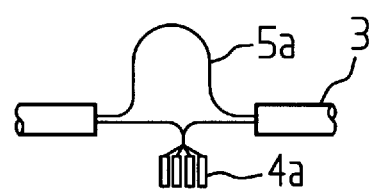
Figure 3:
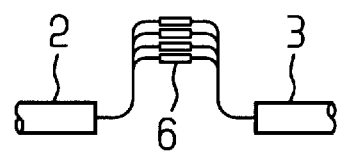
Figure 4:
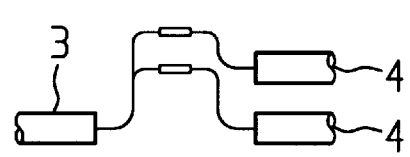
Figure 5:
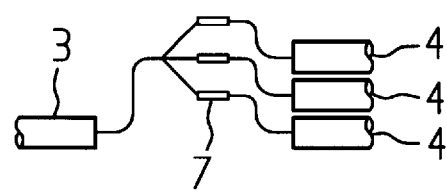

The principles of the present invention are particularly useful when incorporated in a cap sleeve 25 which is closed by a seal member 12 in which a connecting point 1 of the type set forth above is accommodated. An uncut light waveguide multi-fiber loose bundle 9 is inserted in loops within a fastening frame 10 in a simple way. The fastening frame 10 is mounted by a flange 40 on the member 12 and is longitudinally divided along the dividing line 20 so that the inner storage space is accessible. The splicing blocks composed of individual splicing cassettes 8 are fixed on corresponding fastening pins 13, which are arranged in pairs to extend laterally outward on the fastening frame 10. The sealing member 12 has an oval introduction opening 29 for the introduction of uncut cables or individual cables 2 and 3. The sealing occurs in a known way utilizing shrink hoses and gore filler members, which extend between the various cables and an inner surface of the opening 29.

Instead of having the loops of the individual strands 9 loosely received, light waveguide excess lengths 21 can be arranged on two deflection rollers 11 and 22, wherein the roller 22 can be adjusted along a fastening frame 10 by movement in a guide or slot 24. Thus, the light waveguide excess lengths can be rendered taut. The radius of the deflection rollers 11 and 22 correspond to the minimally allowable bending radius of the light waveguides. A guide bow 23, which has a U shape, is arranged in the middle region between the deflection rollers 11 and 22 to surround the light waveguide excess lengths 21.

Figure 8:
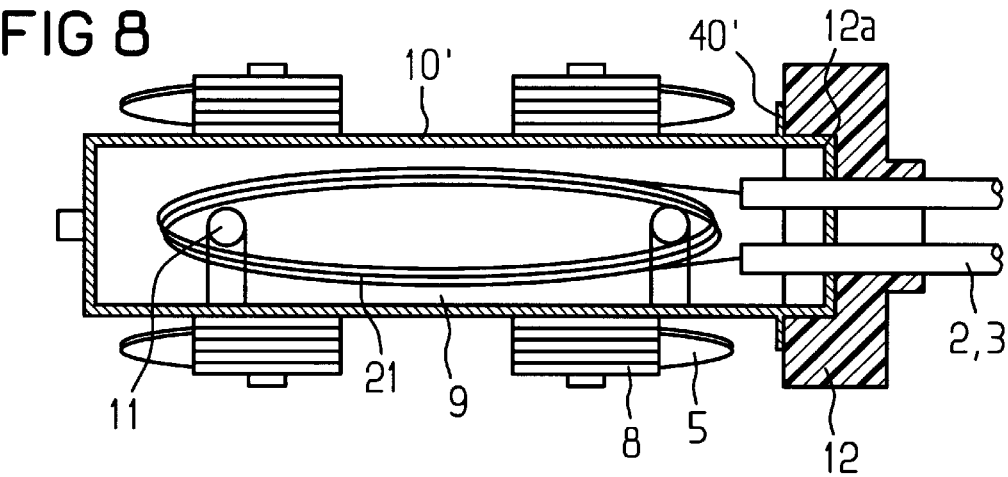
FIG. 8 is a longitudinal cross sectional view of another exemplary embodiment with a closed splicing, space.

In the exemplary embodiment of FIG. 8, the fastening frame 10', in which the deflection roller 11 for the light waveguide excess lengths 21 are arranged, is closed. The frame 10' has an end with a flange 40' which is partially received in a recess 12a in the seal member 12. This improves the stability of the device.

Figure 9:
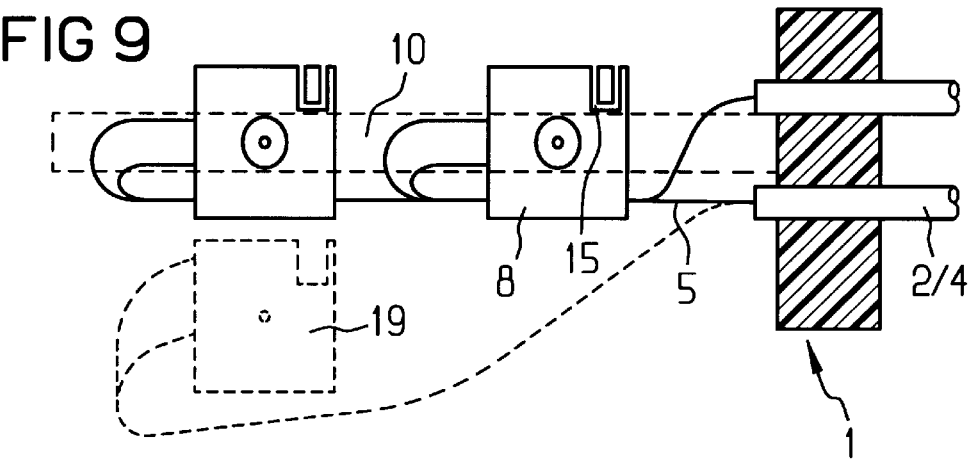
FIG. 9 is a diagrammatic view showing the removal of the individual splicing cassettes.

In FIG. 9, an individual splicing cassette 19 can be removed from the splicing block without having to remove the remaining splicing cassettes 8. This is possible, since each splicing cassette 8 comprises a guide slot 15 with which the splicing cassette 8 is fixed to the fastening frame 10 on the fastening element. Due to this excess length, a light waveguide 5 conducted into the splicing cassette 8 makes it possible that each splicing cassette 8 can be removed and placed onto a processing device, for example a splicing device. This is shown with dotted lines and is intended to illustrate the procedure.

Figure 10:
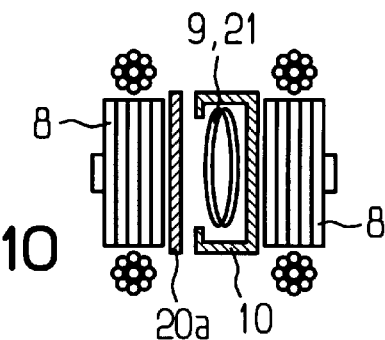
FIG. 10 is a transverse cross sectional view showing the divided structure of the fastening frame.

FIG. 10 is a cross sectional view which shows the U-shaped structure for the fastening frame 10, so that the light waveguide excess lengths 9 and 21 can be accommodated and protected therein. The opening can be closed with a cover plate 20a, as a result whereof the strength is additional increased. The splicing blocks with the individual splicing cassettes 8 are arranged on both sides of the frame 10 and the cover plate 20a.

Figure 11:
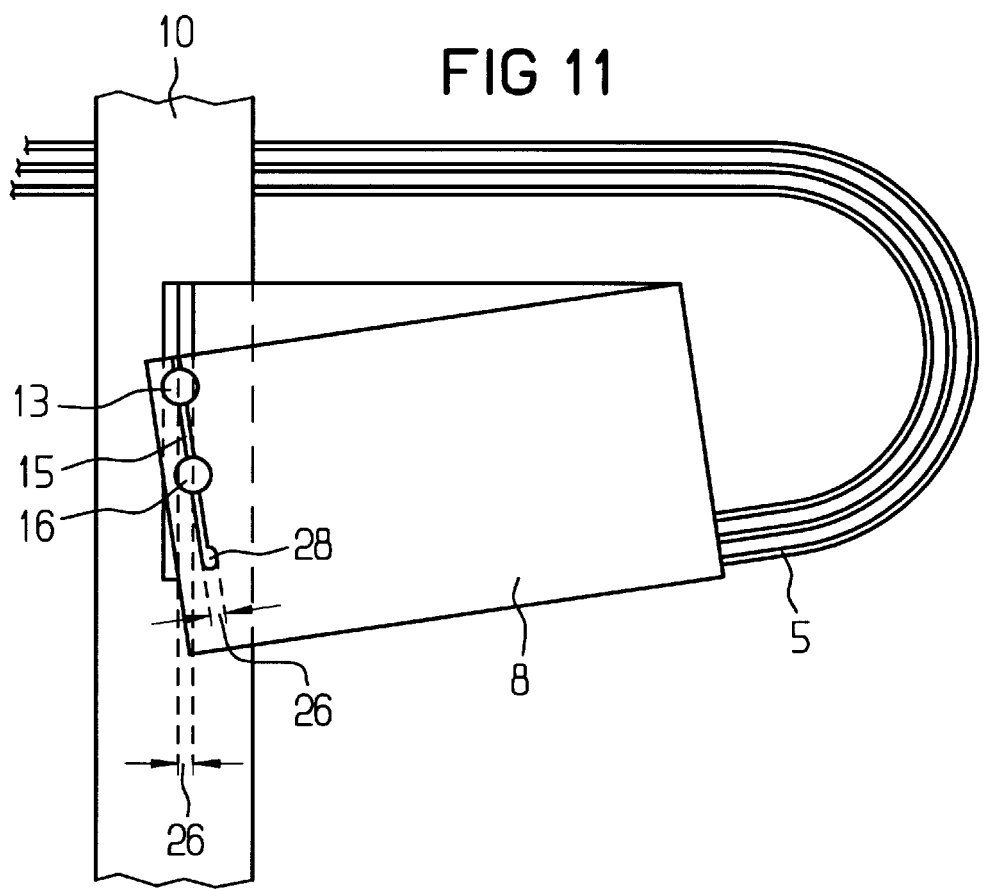
FIG. 11 is a side view of the frame showing the depositing of the splicing cassettes on the frame.

The fastening frame 10 is provided with two projecting pins, with a fastening pin 13 and an auxiliary guide pin 16 (FIGS. 11 and 12), that can be respectively introduced into vertically extending guide slots 15 of the splicing cassettes 8. On the lower end, the guide slot 15 comprises a catch expansion or notch 28, which proceeds perpendicular to the length of the slot 15 and which will receive the auxiliary guide pin 16 after the splicing cassette has been completely inserted. The fastening pin 13 and the auxiliary guide pin 16 are offset from one another in a horizontal direction, namely by a length 26 of the notch or expansion 28. Thus, each splicing cassette can be brought out of its latched position with a tilting motion and can then be removed in a downward direction guided along the slot 15. The fixing in the inserted limit position or assembled position occurs due to the dead weight of the splicing cassette 8.

Figure 12:
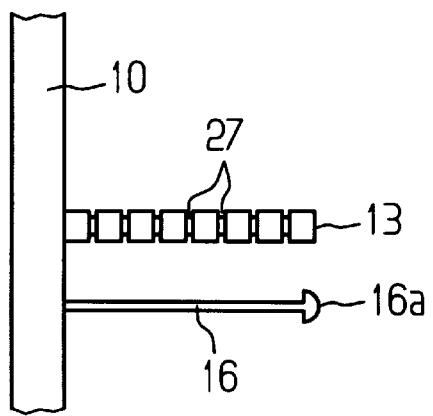
FIG. 12 is a plan view of the frame showing fastening elements for the splicing cassettes.

The fastening pins 13, as shown in FIG. 12, comprise a plurality of space channels or grooves 27 that correspond to the thickness of the splicing cassettes. These channels serve the purpose of reliably guiding and fixing the splicing cassette 8, which lie side-by-side. The guide pin 16 is spaced from the pin 13 and has a knob-shaped anti-slippage protection or head 16a at its end.

The cassette is respectively provided with a latchable cover, which has a guide slot similar to the slot 15 and simultaneously represents the covering of the cassette splicing space.

Although various minor modifications may be suggested by those versed in the art, it should be understood that we wish to embody within the scope of the patent granted hereon all such modifications as reasonably and properly come within the scope of our contribution to the art.

We claim:

1. In a cap sleeve for light waveguide cables comprising a plurality of splicing cassettes combined in a splicing block for the acceptance of light waveguide splices, the improvements comprising a fastening frame being arranged in a seal member of the cap sleeve, said fastening frame having a storage space for uncut light waveguide multi-fiber loose bundled strands, fastening pins being arranged on the fastening frame for holding splicing cassettes, each of the splicing cassettes having a housing with a guide slot into which the fastening pins are respectively introduced so that each splicing cassette is individually removable from the splicing block by a tilting motion.

2. In a cap sleeve according to claim 1, wherein the fastening frame has a U-shaped cross section providing a storage space for the uncut light waveguide multi-fiber loose bundle strands and a cover plate which closes said U-shaped member.

3. In a cap sleeve according to claim 1, wherein the storage space for the uncut light waveguide multi-fiber loose bundles is formed by two deflection rollers arranged at a distance from one another on the fastening frame and a guide bow, wherein the radius of the deflection rollers respectively corresponds to the minimally allowed bending radius for the light waveguides.

4. In a cap sleeve according to claim 3, wherein one of the deflection rollers is displaceable along a guide slot in the fastening frame.

5. In a cap sleeve according to claim 1, wherein the splicing cassettes are divided into a plurality of splicing blocks.

6. In a cap sleeve according to claim 1, wherein the fastening pin comprises a plurality of grooves spaced therealong, said grooves being arranged at a distance from one another that corresponds to the thickness of the splicing cassette and the splicing cassettes are received in said grooves.

7. In a cap sleeve according to claim 1, wherein an auxiliary guide pin is mounted on the fastening frame adjacent to the fastening pin, said auxiliary guide pin being introduced into the guide slot of the splicing cassettes for position fixing thereof.

8. In a cap sleeve according to claim 7, wherein the guide slot comprises a lateral latch extension at an inner end of the slot.

9. In a cap sleeve according to claim 8, wherein the fastening pin and auxiliary pin are offset relative to one another by the length of said latch expansion.

10. In a cap sleeve according to claim 7, wherein a sheet metal cover of the splicing cassette is provided with the guide slot and simultaneously forms a covering for the splicing space of the cassette.

11. In a cap sleeve according to claim 10, wherein the covering can be latched.

* * * * *